United States Patent Office 2,749,361
Patented June 5, 1956

2,749,361

CYCLOHEXANECARBOXAMIDES

Harry L. Yale, New Brunswick, N. J., assignor to Olin Mathieson Chemical Corporation, New York, N. Y., a corporation of Virginia No Drawing. Application August 29, 1951,
Serial No. 244,253

2 Claims. (Cl. 260—503)

This invention relates to, and has for its object the provision of [A] compounds of the general formula

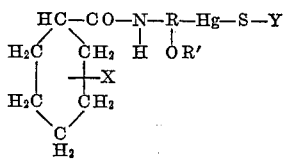

wherein R is a lower alkylene group, R' is a member of the class consisting of hydrogen and lower alkyl groups, X is a member of the class consisting of —COOH, —CH₂COOH, —OCH₂COOH and —SO₃H groups, and Y is a monovalent organic group linked to the sulfur through a carbon atom thereof; [B] salts thereof; and [C] method of preparing [A] and [B]. These compounds are valuable therapeutic agents, being especially effective diuretics.

The monovalent organic groups represented by Y include acyclic, aromatic and heterocyclic groups. Among the acyclic radicals are the following: carboxyalkyl- and esters thereof (e. g., —CH₂COOH), imino-alkyl-, e. g.,

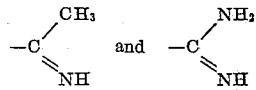

and carboxyaminoalkyl- (e. g., —CH₂CH(NH₂)COOH). The aromatic groups include: aryl (e. g., o-carboxyphenyl- and o-methoxyphenyl-); and the heterocyclic groups include: -C-thiazolyls- and pyrimidyls-, e. g.,

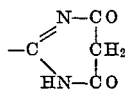

However, the invention comprises especially compounds wherein X is a carboxylic group, Y is a carboxyalkyl group, and R' is a lower alkyl group.

The compounds of this invention are prepared by the method essentially comprising interacting a compound of the general formula

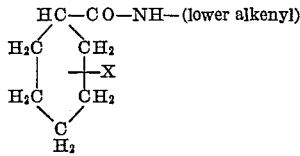

with a divalent mercury salt (preferably with a divalent mercury salt of a lower fatty acid in the presence of a lower aliphatic alcohol), converting the reaction product to the corresponding compound of the general formula

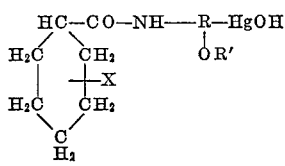

and interacting the latter with a compound of the general formula R''—S—Y (I) wherein R'' is a member of the class consisting of hydrogen, alkali metals (including ammonium) and alkaline earth metals (e. g. calcium); and where the salts are desired, the latter reactants are employed in the water-soluble salt form, or the reaction product is salified in the conventional manner. Among the utilizable reactants I are: potassium ethylxanthate, sodium thioacetate, sodium thioglycollate, ethyl thioglycollate, sodium salt of cysteine, sodium thiosalicylate, thiourea, N-methyl thiourea, thioacetamide, thiouracil, and sodium thiobarbiturate.

The following examples are illustrative of the invention:

EXAMPLE 1

*Preparation of the sodium salt of 4-[(3-carboxymethylmercaptomercuri -2- methoxypropyl) carbamyl]cyclohexanecarboxylic acid and the disodium salt thereof*

A. *Dimethyl ester of 1,4-cyclohexanedicarboxylic acid.*—40 g. dimethyl ester of terephthalic acid [Ber. 37, 2001 (1904)], are reacted with 5 g. platinic oxide and 250 ml. pure glacial acetic acid, following the method given in J. Ind. Inst. Sci. 22A, 262–74 (1939), and the dimethyl ester of 1,4-cyclohexanedicarboxylic acid is obtained.

B. *Monomethylester of 1,4 - cyclohexanedicarboxylic acid.*—To 40 g. (0.2 mole) dimethyl ester of 1,4-cyclohexanedicarboxylic acid in 600 ml. of methanol is added slowly, with stirring, 13.2 g. (0.2 mole) 85% KOH in 200 ml. of methanol; and the clear solution is refluxed 3 hours and concentrated on the steam bath. The residue is then partitioned between 300 ml. of ether and 200 ml. of water, and the water layer is separated and acidified with 20% hydrochloric acid to pH 2.0. After cooling, the solid is filtered and recrystallized twice from hot water; it weighs about 25 g. and melts at about 102–5° C.

[The compound can be further purified by recrystallization with 5 ml. carbon tetrachloride per gram of crude compound to give a purer sample of the half ester, melting at about 112–114° C.]

C. *Methyl ester of 4-chloroformyl-cyclohexanecarboxylic acid.*—A mixture of 27.5 g. of the crude half ester prepared in B and 34.5 g. purified thionyl chloride is allowed to stand overnight, refluxed 3 hours, and worked up to give about 28.5 g. of the product, boiling at about 105–109° C. at 10 mm. pressure.

D. *Methyl ester of 4-(allylcarbamyl)cyclohexanecarboxylic acid.*—To an ice-cold mixture of 28.1 g. of the acid chloride prepared in C, 100 ml. of dry benzene, and 14 g. of N-methyl-morpholine is added 7.98 g. redistilled allylamine in 50 ml. of dry benzene. After standing overnight, the mixture is stirred, refluxed one-half hour, cooled, filtered, concentrated and redistilled to give the amide, boiling at about 160–5° C. (After recrystallization from heptane it melts at about 118° C.)

E. *4 - (allylcarbamyl)cyclohexanecarboxylic acid.*—A mixed solution of 17 g. (0.076 mole) of the methyl ester of 4-(allylcarbamyl)cyclohexanecarboxylic acid prepared in D, in 200 ml. of methanol is treated dropwise with 5 g. (0.075 mole) of 85% KOH in 50 ml. of methanol during one-half hour. The mixture is refluxed for two hours, then concentrated on the steam bath. The residue is cooled, dissolved in 100 ml. of water, and acidified, while cold, with 20% HCl to pH 2.0. The precipitated solid, recrystallized from boiling water, yields about 12 g. (75%) of a white solid, melting at about 214–16° C.

F. To 2.11 g. (0.01 mole) of the acid amide prepared in E in 10 ml. of methanol is added a warm solution of 3.18 g. (0.01 mole) of mercuric acetate in 40 ml. of methanol; and a solid separates immediately. The latter is filtered off and washed with boiling methanol, to yield about 3.15 g. (62.8%) of a white powder, 4-[(3-acetoxymercuri - 2-methoxypropyl)carbamyl]cyclohexanecarboxylic acid, which is insoluble in common solvents, and which melts at about 205° C. (dec.).

To 3.05 g. of the latter solid suspended in 50 ml. of water is added 6.1 ml. of normal NaOH; and a clear, yellow-colored solution of the sodium salt of 4-[(3-hydroxymercuri - 2 - methoxypropyl)carbamyl]cyclohexanecarboxylic acid forms.

To this solution is then added 0.7 g. of 71% thioglycollic acid and followed by 6.1 ml. of normal NaOH. The clear solution is allowed to stand overnight, steam-distilled (to remove acetic acid), clarified with Hyflo, freeze-dried, and further dried, if necessary.

Analysis indicates a nitrogen content of 2.04%, a sulfur content of 5.38%, a sodium content of 6.77% and a mercury content of 36.6%; and this is in close agreement with the values calculated for the disodium salt of 4-[(3-carboxymethylmercaptomercuri - 2 - methoxypropyl)carbamyl]cyclohexanecarboxylic acid.

This compound possesses high diuretic efficiency, and can be administered orally, intramuscularly or intravenously with a minimum of side reactions.

EXAMPLE 2

Using a molar equivalent of 2-butenyl amine in place of allylamine in Example 1D, and proceeding as indicated in D and E, 4-(2-butenylcarbamyl)cyclohexanecarboxylic acid is obtained; and, from this, the disodium salt of 4 - [(3 - carboxymethylmercaptomercuri - 2 - methoxybutyl)carbamyl]cyclohexanecarboxylic acid is produced.

EXAMPLE 3

To 2.11 g. of 4-(allylcarbamyl)cyclohexanecarboxylic acid, prepared in Example 1E in 10 ml. of propyl alcohol is added a warm solution of 3.15 g. of mercuric acetate; and 4 - [(3-acetoxymercuri-2-propoxypropyl)carbamyl]-cyclohexanecarboxylic acid is obtained. Following the procedure of Example 1F, the disodium salt of 4-[(3-carboxymethylmercapto - 2 - propoxypropyl)carbamyl]-cyclohexanecarboxylic acid is obtained.

EXAMPLE 4

Using a molar equivalent of thiosalicylic acid in place of mercaptoacetic acid and proceeding as indicated in Example 1, the corresponding salt, the disodium salt of 4 - [(3-carboxyphenylmercaptomercuri-2-methoxypropyl)carbamyl]cyclohexanecarboxylic acid, is obtained.

EXAMPLE 5

Using a molar equivalent of the dimethyl ester of phthalic acid in place of the corresponding terephthalic compound in Example 1, the 2-(allylcarbamyl)cyclohexanecarboxylic acid is obtained as the intermediate; and finally the disodium salt of 2-[(3-carboxymethylmercaptomercuri - 2 - methoxypropyl)carbamyl]cyclohexanecarboxylic acid is produced.

EXAMPLE 6

Using a molar equivalent of thiobarbituric acid in place of mercaptoacetic acid and proceeding as indicated in Example 1, the corresponding disodium salt of 4-[(3-thiobarbiturylmercuri - 2-methoxypropyl)carbamyl]cyclohexanecarboxylic acid is obtained.

The invention may be variously otherwise embodied within the scope of the appended claims.

I claim:

1. Compounds of the general formula

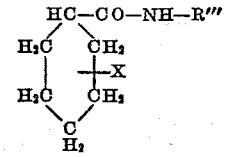

wherein R''' is a lower alkenyl group containing at least three carbon atoms, X is a member of the class consisting of —COOH, —CH₂COOH, —OCH₂COOH and —SO₃H groups.

2. 4-(allylcarbamyl)cyclohaxenecarboxylic acid.

References Cited in the file of this patent

UNITED STATES PATENTS

| 2,117,901 | Molnar | May 17, 1938 |
| 2,130,989 | Schimmelschmidt | Sept. 20, 1938 |
| 2,167,325 | Steindorff et al. | July 25, 1939 |
| 2,208,941 | Geiger et al. | July 23, 1940 |
| 2,315,817 | Ruzicka | Apr. 6, 1943 |
| 2,471,621 | Hartmann et al. | May 31, 1949 |
| 2,557,772 | Shelton et al. | June 19, 1951 |

FOREIGN PATENTS

| 619,515 | Great Britain | Mar. 10, 1949 |